(12) United States Patent
Zellhuber et al.

(10) Patent No.: US 12,454,500 B2
(45) Date of Patent: Oct. 28, 2025

(54) PROCESS AND SYSTEM FOR PRODUCING A PRODUCT HYDROCARBON

(71) Applicant: LINDE GMBH, Pullach (DE)

(72) Inventors: Mathieu Zellhuber, Martinsried (DE); Martin Schubert, Munich (DE); Andreas Meiswinkel, Rimsting (DE); Anina Wohl, Munich (DE)

(73) Assignee: Linde GmbH, Pullach (DE)

( * ) Notice: Subject to any disclaimer, the term of this patent is extended or adjusted under 35 U.S.C. 154(b) by 130 days.

(21) Appl. No.: 18/549,580

(22) PCT Filed: Mar. 14, 2022

(86) PCT No.: PCT/EP2022/056566
§ 371 (c)(1),
(2) Date: Sep. 7, 2023

(87) PCT Pub. No.: WO2022/194791
PCT Pub. Date: Sep. 22, 2022

(65) Prior Publication Data
US 2024/0150262 A1    May 9, 2024

(30) Foreign Application Priority Data
Mar. 15, 2021 (EP) ..................... 21162664

(51) Int. Cl.
*C07C 5/48* (2006.01)
(52) U.S. Cl.
CPC ............ *C07C 5/48* (2013.01); *C07C 2523/20* (2013.01); *C07C 2523/22* (2013.01); *C07C 2523/28* (2013.01); *C07C 2527/057* (2013.01)
(58) Field of Classification Search
CPC ... C07C 5/48; C07C 2523/20; C07C 2523/22; C07C 2523/28; C07C 2523/648; C07C 2523/652; C07C 2527/057; C07C 51/215
See application file for complete search history.

(56) References Cited

U.S. PATENT DOCUMENTS

| | | |
|---|---|---|
| 3,709,951 A | 1/1973 | Hutson et al. |
| 5,066,365 A | 11/1991 | Roscher et al. |
| | (Continued) | |

FOREIGN PATENT DOCUMENTS

| | | | | |
|---|---|---|---|---|
| CA | 926622 A | 5/1973 | | |
| CA | 3100928 A1 * | 12/2019 | ............ | B01J 8/0496 |
| | (Continued) | | | |

OTHER PUBLICATIONS

International Search Report and Written Opinion issued in related App. No. PCT/EP2022/056566, mailed Jun. 28, 2022.

*Primary Examiner* — In Suk C Bullock
*Assistant Examiner* — Jason Y Chong
(74) *Attorney, Agent, or Firm* — Avek IP, LLC

(57) ABSTRACT

Producing a product hydrocarbon includes subjecting a feed mixture containing a feed hydrocarbon and oxygen to selective oxidation to obtain a product mixture containing product hydrocarbon and water. A subsequent mixture is formed from a portion of the product mixture by separating a portion of the water. Oxygen in the feed mixture is partially converted during the selective oxidation, so that the product mixture has a first residual oxygen content and the subsequent mixture has a second residual oxygen content. Detection of the first and/or the second residual oxygen content is performed using a first measuring device. A second measuring device at the end of the catalyst bed detects temperature. Using a process control and/or evaluation unit, measurement data of the first and/or second measuring device(s) are detected and are evaluated and/or processed while obtaining follow-up data. Process control is carried out on the basis of the follow-up data.

16 Claims, 2 Drawing Sheets

(56) References Cited

U.S. PATENT DOCUMENTS

| | | | |
|---|---|---|---|
| 5,820,747 | A | 10/1998 | Lenglet et al. |
| 5,907,056 | A | 5/1999 | Karim et al. |
| 6,030,920 | A | 2/2000 | Karim et al. |
| 6,237,341 | B1 | 5/2001 | Koike et al. |
| 6,258,992 | B1 | 7/2001 | Karim et al. |
| 8,519,210 | B2 | 8/2013 | Arnold et al. |
| 9,963,412 | B2 | 5/2018 | Bos et al. |
| 10,017,432 | B2 | 7/2018 | Bos et al. |
| 10,730,810 | B2 | 8/2020 | Peschel et al. |
| 10,730,811 | B2 | 8/2020 | Zellhuber et al. |
| 2002/0058849 | A1 | 5/2002 | Colling et al. |
| 2002/0082445 | A1 | 6/2002 | Ellis et al. |
| 2005/0148791 | A1 | 7/2005 | Lucy et al. |
| 2005/0261532 | A1 | 11/2005 | Stell et al. |
| 2010/0256432 | A1 | 10/2010 | Arnold et al. |
| 2014/0024873 | A1 | 1/2014 | De Haan et al. |
| 2014/0066650 | A1 | 3/2014 | Aslam et al. |
| 2016/0304432 | A1 | 10/2016 | Bos et al. |
| 2019/0359544 | A1* | 11/2019 | Zellhuber ............. C07C 5/48 |
| 2023/0046854 | A1 | 2/2023 | Kaiser et al. |
| 2024/0150262 | A1 | 5/2024 | Zellhuber et al. |
| 2024/0166579 | A1 | 5/2024 | Zellhuber et al. |
| 2024/0317667 | A1 | 9/2024 | De Val et al. |
| 2025/0051665 | A1 | 2/2025 | Kracker et al. |
| 2025/0129303 | A1 | 4/2025 | Kracker et al. |

FOREIGN PATENT DOCUMENTS

| | | |
|---|---|---|
| CN | 103086821 A | 5/2013 |
| CN | 103086824 A | 5/2013 |
| CN | 103086824 B | 5/2013 |
| DE | 102011102971 A1 | 12/2012 |
| DE | 102019119540 A1 | 1/2021 |
| EP | 0100406 A1 | 2/1984 |
| EP | 1140355 B1 | 10/2001 |
| EP | 2096157 A2 | 9/2009 |
| EP | 2740718 A1 | 6/2014 |
| EP | 2772524 A1 | 9/2014 |
| EP | 3249027 A1 | 11/2017 |
| EP | 3339277 A1 | 6/2018 |
| EP | 3456703 A1 | 3/2019 |
| EP | 3519377 B1 | 8/2019 |
| EP | 3558910 B1 | 10/2019 |
| EP | 3708557 A1 | 9/2020 |
| EP | 3708558 A1 | 9/2020 |
| RU | 2730518 C2 | 8/2020 |
| WO | 9301155 A1 | 1/1993 |
| WO | 9805620 A1 | 2/1998 |
| WO | 0069802 A1 | 11/2000 |
| WO | 0190042 A1 | 11/2001 |
| WO | 2010014153 A2 | 2/2010 |
| WO | 2010115108 A1 | 10/2010 |
| WO | 2011056597 A2 | 5/2011 |
| WO | 2011097190 A2 | 8/2011 |
| WO | 2013101373 A1 | 7/2013 |
| WO | 2013122645 A1 | 8/2013 |
| WO | 2014134703 A1 | 9/2014 |
| WO | 2015181302 A1 | 12/2015 |
| WO | 2017144584 A1 | 8/2017 |
| WO | 2017198762 A1 | 11/2017 |
| WO | 2018019760 A1 | 2/2018 |
| WO | 2018019761 A1 | 2/2018 |
| WO | 2018024650 A1 | 2/2018 |
| WO | 2018082945 A1 | 5/2018 |
| WO | 2018114747 A1 | 6/2018 |
| WO | 2018114752 A1 | 6/2018 |
| WO | 2018114900 A1 | 6/2018 |
| WO | 2018115414 A1 | 6/2018 |
| WO | 2018115416 A1 | 6/2018 |
| WO | 2018115418 A1 | 6/2018 |
| WO | 2018115494 A1 | 6/2018 |
| WO | 2018153831 A1 | 8/2018 |
| WO | 2019081682 A1 | 5/2019 |
| WO | 2019175731 A1 | 9/2019 |
| WO | 2019175732 A1 | 9/2019 |
| WO | 2019243480 A1 | 12/2019 |
| WO | 2020002326 A1 | 1/2020 |
| WO | 2020074750 A1 | 4/2020 |
| WO | 2020187572 A1 | 9/2020 |
| WO | 2023049570 A1 | 3/2023 |

\* cited by examiner

PROCESS AND SYSTEM FOR PRODUCING A PRODUCT HYDROCARBON

CROSS-REFERENCE TO RELATED APPLICATIONS

This application is the national phase of, and claims priority to, International Application No. PCT/EP2022/056566, filed Mar. 14, 2022, which claims priority to European Patent Application No. EP21162664.3, filed Mar. 15, 2021.

FIELD OF THE INVENTION

The invention relates to a method and a plant for producing a product hydrocarbon.

BACKGROUND

The oxidative dehydrogenation (ODH) of kerosenes with two to four carbon atoms is known in principle. In ODH, said kerosenes are reacted with oxygen to form, among other things, the respective olefins and water. The invention relates to the oxidative dehydrogenation of ethane to ethylene, hereinafter also referred to as ODHE, as a process for the selective catalytic oxidation of hydrocarbons.

In contrast, U.S. Pat. No. 3,709,951 A discloses a method for the oxidative dehydrogenation of olefins containing at least four carbon atoms to produce conjugated diolefins, wherein a feed stream comprising the olefin, oxygen and steam is contacted with a catalyst at an elevated reaction temperature to convert the olefin to the conjugated diolefin contained in an effluent stream comprising oxygen, the improvement comprising measuring the concentration of oxygen in the effluent stream and adjusting the reaction temperature in response thereto to adjust the amount of conjugated diolefins in the effluent stream.

ODH can be advantageous over more established olefin production processes such as steam cracking or catalytic dehydrogenation. For example, there is no thermodynamic equilibrium limitation due to the exothermic nature of the reactions involved and the practically irreversible formation of water. ODH can be carried out at comparatively low reaction temperatures. In principle, no regeneration of the catalysts used is required, since the presence of oxygen enables or causes in situ regeneration. Finally, in contrast to steam cracking, smaller amounts of worthless by-products such as coke are formed.

For further details regarding ODH, reference should be made to relevant literature, for example, Ivars, F. and López Nieto, J. M., Light Alkanes Oxidation: Targets Reached and Current Challenges, in Duprez, D. and Cavani, F. (eds.), Handbook of Advanced Methods and Processes in Oxidation Catalysis: From Laboratory to Industry, London 2014: Imperial College Press, pages 767-834, or Gartner, C. A. et al, Oxidative Dehydrogenation of Ethane: Common Principles and Mechanistic Aspects, ChemCatChem, vol. 5, no. 11, 2013, pages 3196 to 3217, and X. Li, E. Iglesia, Kinetics and Mechanism of Ethane Oxidation to Acetic Acid on Catalysts Based on Mo—V—Nb Oxides, J. Phys. Chem. C, 2008, 112, 15001-15008, referenced.

In ODH, $MoVNbO_x$- and $MoVNbTeO_x$-based catalysts are used in particular, which form significant amounts of the respective carboxylic acids of the kerosenes used, in particular acetic acid in the case of ODHE, as by-products under industrially relevant reaction conditions.

According to the state of the art, the reaction in ODH is preferably carried out in fixed-bed reactors, in particular in cooled shell-and-tube reactors, for example with molten salt cooling. For strongly exothermic reactions, i.e. in particular oxidative reactions, which also includes ODH-E, the use of a reactor bed with several zones is generally known in this context. Basic principles are described, for example in WO 2019/243480 A1. This document discloses the principle that different catalyst beds or corresponding reaction zones, which have different catalyst loadings and/or catalyst activities per unit of space, are used.

The end region of the corresponding (single- or multilayer) catalyst bed is also subject to particular stresses, since the progress of the reaction usually means that only a low residual oxygen concentration is still present here. Here, the term "end" or "end region" is intended to mean the region where the gas flowing through the reactor or a corresponding reaction tube leaves the catalyst bed. However, the catalysts mentioned above require a certain minimum oxygen content in the reaction gas in order not to be destroyed. On the other hand, the oxygen content at the reactor outlet must not exceed a certain limit value in order to avoid excessive oxygen enrichment and thus the possible formation of an explosive atmosphere in subsequent process steps.

According to the prior art, the use of a downstream oxygen removal is known. For example, U.S. Pat. No. 8,519,210 B2 describes downstream oxygen removal or oxygen removal integrated in an ODH-E reactor, but only mentions an "oxygen elimination catalyst" in very general terms. In the descriptive part, for oxygen elimination or removal, a combustion of preferably carbon monoxide and possibly hydrocarbons with two and less carbon atoms, which means a yield loss, is described. According to this document, in particular, a material independent and different from the actual ODH-E catalyst can be used and the underlying reaction is a conversion to carbon monoxide and/or carbon dioxide and water.

A similar method is also described in WO 2017/144584 A1. Here, the oxygen removal catalyst is also preferably used in the ODH reactor downstream of the main reaction zone, whereby the oxygen removal catalyst is similar to the ODH catalyst, but preferably contains additional elements such as Sb, Pt, Pd and Cu or Fe, i.e. preferably has a different composition or is even selected from a different catalyst class. The additional elements mentioned typically also mostly catalyze the conversion to carbon monoxide and/or carbon dioxide and water.

The main purpose of removing as much oxygen as possible from the ODH-E product gas, as described, for example in U.S. Pat. No. 8,519,210 B2 and WO 2017/144584 A1, is to reduce the oxygen content in order to avoid its accumulation during the processing of the process gas in the separation section and thus the possible formation of ignitable mixtures, for example, in the light gas fraction of a sequential cryogenic separation. However, the reduction in oxygen content, as described above, comes at the cost of partial destruction of valuable products.

Furthermore, the oxygen in an ODH-E process can also take place downstream of the reactor at another point, for example, downstream of a process gas compression but upstream of the cryogenic separation, via copper-based catalysts, as described for example in WO 2018/153831 A1. However, this variant also leads to a certain loss of ethane and the value product ethylene, since here, the oxygen is also catalytically reacted in the presence of and with the other process gas components (ethane and ethylene as well as carbon monoxide), as a result of which part of the value product ethylene is lost through total oxidation.

SUMMARY

Against this background, the invention sets itself the task of providing an improved method for controlling and/or reducing the oxygen content at the end of a reactor used for ODH(-E) and in this way enabling, in particular, an increased catalyst service life and largely automated plant operation, which facilitates plant monitoring and ensures the most uniform plant operation possible.

According to one embodiment of the invention, a method for producing a product hydrocarbon includes subjecting a feed hydrocarbon in a feed mixture containing the feed hydrocarbon and oxygen to selective oxidation in a reactor having a catalyst bed to obtain a product mixture containing the product hydrocarbon and water, wherein the feed hydrocarbon is ethane and the product hydrocarbon is ethylene and the selective oxidation is carried out in the form of oxidative dehydrogenation of ethane. The method further includes forming a subsequent mixture from at least part of the product mixture by separating at least part of the water. The method is carried out in such a way that the oxygen contained in the feed mixture is partially converted during the selective oxidation, so that the product mixture has a first residual oxygen content and the subsequent mixture has a second residual oxygen content. A detection of the first and/or of the second residual oxygen content is carried out using at least a first measuring device. At least one second measuring device is provided at the end of the catalyst bed and is set up to detect a variable characterizing an operating stability, the variable characterizing the operating stability being a temperature at the end of the catalyst bed. Using a process control and/or evaluation unit, measurement data of the at least one first measuring device and/or the at least one second measuring device are detected over a detection period and are evaluated and/or processed to obtain follow-up data. Process control is carried out on the basis of the follow-up data, which includes adjusting at least one operating parameter. The reactor used for the selective oxidation is cooled using at least one coolant. The at least one operating parameter represents or comprises a coolant temperature of the at least one coolant or an oxygen content of the feed mixture.

WRITTEN DESCRIPTION

Figure 1:
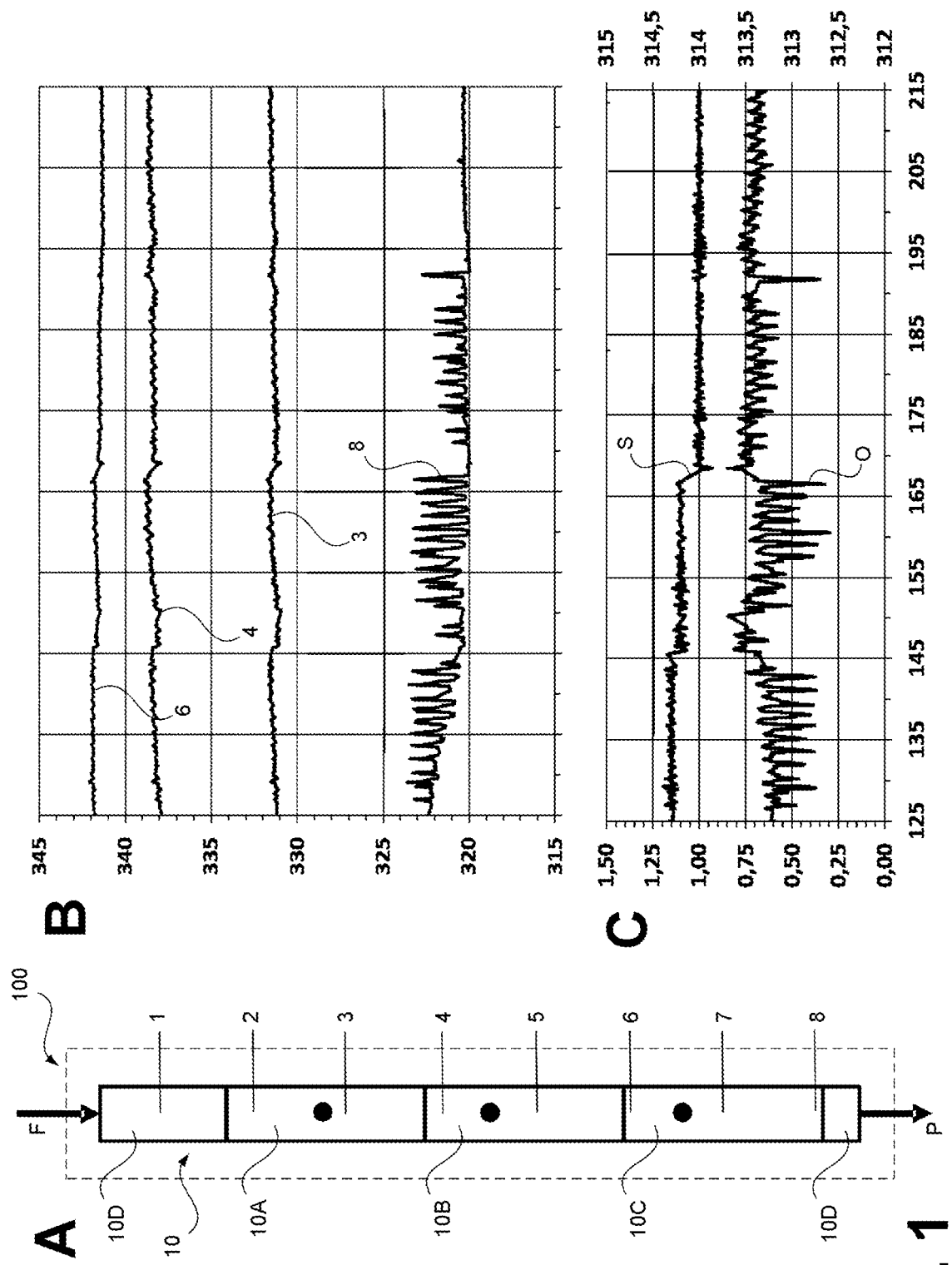
FIGS. 1 and 2 show the sensitivity of the stability of the reaction operation as a function of the average oxygen concentration in the dry product gas.

Before explaining the features and advantages of the invention, basic principles of the invention are first explained in more detail and terms used in describing the invention are defined.

In methods for the selective oxidation of hydrocarbons, in particular of alkanes with one to six carbon atoms, especially in the oxidative dehydrogenation of alkanes with one to six carbon atoms and in particular in the oxidative dehydrogenation of ethane to ethylene and acetic acid using $MoVNbO_x$ or $MoVNbTeO_x$ based catalysts, a certain minimum proportion of oxygen in the product gas or in the reaction gas in the catalyst bed is necessary to maintain the integrity and stability of the catalyst, as mentioned above. A too low oxygen content or, in extreme cases, no oxygen in the product gas, i.e. predominantly or strongly reductive conditions in the catalyst bed, lead to an increased reduction of the catalyst material, which results in the loss of the active crystalline M1 phase in particular of a $MoVNbO_x$ or $MoVNbTeO_x$ catalyst system and thus to the loss of catalytic activity and furthermore also in the loss of mechanical integrity of the primary catalyst crystals and finally of the catalyst shaped bodies.

According to WO 2017/144584 A1, reductive conditions in particular, i.e. the greatest possible or complete absence of oxygen in the product gas, can lead to a loss of tellurium from the catalyst, especially in the case of $MoVNbTeO_x$ catalysts at the reaction temperatures typical for ODH, which on the one hand leads to the loss of activity/selectivity of the catalyst described above as well as its mechanical stability, and on the other hand can lead to problems due to tellurium deposits in downstream plant components.

Since the oxygen reacts with the ethane during the reaction in the direction of flow across the catalyst bed, its concentration (or its partial pressure) in the reaction gas decreases over the catalyst bed length (or reactor length) and is lowest at the end of the catalyst bed, as already mentioned above. Therefore, in the case where a concentration of oxygen is too low in the reaction or product gas, the catalyst bed deactivates against the flow direction from back to front, i.e. from the end of the catalyst bed near the product gas outlet in the direction upstream to the start of the catalyst bed. The deactivation direction of the catalyst bed is thus opposite to the deactivation direction of a typical catalyst poisoning, where the catalyst bed is deactivated in the flow direction of the reaction feed from the start of the catalyst bed.

Certain process disturbances which excessively reduce the oxygen content at the reactor outlet or at the end of the (single- or multi-layer) ODH-E catalyst bed will thus, as mentioned above, affect the catalyst activity and catalyst selectivity in this area, unless suitable rapid measures are taken to adjust the operating conditions. Such process disturbances can be, for example (list not exhaustive), an excessively high coolant temperature or an excessively low oxygen concentration in the reaction feed stream. These can be caused, for example, by disturbances in the flow control of, for example, the feed water provided for cooling the cooling medium or the oxygen or ethane flow in the reaction feed stream. In reality, as a result of such process disturbances, significant fluctuations in the oxygen concentration then become apparent at this point, particularly at low oxygen concentrations during operation of an ODH-E reactor at the outlet of a (single- or multi-layer) catalyst bed. This often corresponds to a temperature fluctuation in this area, and the effects also sometimes build up. A too low oxygen concentration in this area can therefore not only damage the catalyst, but can also cause an undesired unstable operation in the exit zone.

In this case, oxygen removal as described in U.S. Pat. No. 8,519,210 B2 and WO 2017/144584 A1 is therefore not helpful, since as a countermeasure a comparatively high oxygen content must be allowed at the end of the (single- or multi-layer) ODH-E catalyst bed, which then leads again to a corresponding increase of the combustion fraction and a corresponding overall loss of selectivity in the subsequent oxygen removal.

This problem can be circumvented by making the light gas separation in the cryogenic separation section explosion-proof or explosion-propagation-inhibiting, as described in WO 2018/082945 A1. In this way, a significantly higher oxygen concentration of up to 2 mole percent can be permitted in the dry process gas, i.e. after separating the resulting process condensate (consisting of water fed to the reactor plus reaction water as well as acetic acid and possibly further traces of oxygenate).

The invention proposes a different approach compared to the prior art explained at the beginning, which comprises in particular a targeted adjustment of the oxygen content at the end of the reactor, and referred to here as "residual oxygen content". According to the invention, a residual oxygen content in a product mixture of the method used for selective oxidation before and/or after a removal of water therefrom is kept in a particularly preferred range, or more precisely, above a minimum concentration and below a maximum concentration, which on the one hand ensures a sufficient residual amount of oxygen at the end of the catalyst bed or beds and on the other hand prevents safety-critical values from being reached downstream thereof.

Overall, the invention proposes a method for producing a product hydrocarbon, in which a feed hydrocarbon in a feed mixture containing the feed hydrocarbon and oxygen is subjected to selective oxidation in a reactor having a catalyst bed, while obtaining a product mixture containing the product hydrocarbon and water. The catalyst bed according to the invention can also comprise several zones with different catalysts, in particular with different activities, which can also be regarded as separate catalyst beds. Therefore, if a catalyst bed is referred to below, it can also be formed from several (partial) beds or corresponding zones. The feed hydrocarbon is ethane, the product hydrocarbon is ethylene. The selective oxidation is carried out in the manner explained at the outset and known in principle in the form of an oxidative dehydrogenation with the catalysts also specified below. In other words, the invention is used in connection with an oxidative dehydrogenation of ethane and is described below with particular reference thereto. Where reference is made hereinafter to the production of a product hydrocarbon in the singular, this does not exclude the formation of other product hydrocarbons and one or more co-products or by-products, such as in particular one or more organic acids. Similarly, the wording according to which one feed hydrocarbon is used does not exclude the use of other feed hydrocarbons.

In the method according to the invention, a subsequent mixture is formed from at least part of the product mixture by separating at least part of the water, and the method is carried out according to the invention using the measures explained below in such a way that the oxygen contained in the feed mixture is (only) partially converted during the selective oxidation, so that the product mixture has a first residual oxygen content and the subsequent mixture has a second residual oxygen content. According to the invention, the first residual oxygen content is at least 0.41 mole percent and the second residual oxygen content is at least 0.62 mole percent, and measures explained below are taken to adjust the first and/or second residual oxygen content.

In the context of the invention, removing at least part of the water can be carried out in particular by condensative separation of water, in which further products of the ODHE, in particular acetic acid, are also separated. For the product mixture present upstream of the corresponding water removal, the term "moist" is also used hereinafter, and the term "dry" for the product mixture or the part of the product mixture previously subjected to the removal of water.

According to the invention, a detection of the first and/or second residual oxygen content is carried out using at least a first measuring device. Furthermore, at least one second measuring device is provided at the end of the catalyst bed, which is set up to detect a variable characterizing an operating stability, the variable characterizing the operating stability being a temperature at the end of the catalyst bed, and using a process control and/or evaluation unit, measurement data of the at least one first measuring device and/or of the at least one second measuring device are detected over a detection period and evaluated and/or processed to obtain follow-up data. A process control is then carried out in the manner explained further below using the follow-up data. The reactor used for the selective oxidation is cooled using at least one coolant, and the at least one operating parameter in this case represents or comprises a coolant temperature of the at least one coolant. Alternatively or additionally, the at least one operating parameter may represent or comprise an oxygen content of the feed mixture.

According to one embodiment of the invention, the method is carried out in particular such that the first residual oxygen content is at least 0.41 mole percent and the second residual oxygen content is at least 0.62 mole percent. In particular, the method may be carried out such that the second residual oxygen content is at most 2.0 mole percent, at most 1.8 mole percent, or in particular at most 1.5 mole percent. As also explained below, the said values and intermediate values can be used to define threshold values, above which certain operational measures are taken, comprising the corresponding adjustment of certain operating parameters. However, the core of the invention is in particular the realization that the adjustment of the oxygen content to the aforementioned ranges of values offers in itself surprising and unexpected advantages, as evidenced in particular with reference to the attached examples, whereas the measures used for the adjustment may be different.

The advantages which can be achieved by the invention include, in particular, an increase in the running time of the catalyst bed, an increase in the tolerance of the catalyst bed to disturbances such as variations in temperature, flow, composition (in particular the oxygen content), an improved guarantee of a maximum acceptable oxygen concentration at the reactor outlet, an avoidance of unstable operating conditions and thus an increase in operational safety, an early, automated detection of potentially unstable operating conditions and the possibility of automatic initiation of suitable countermeasures and thus extensive automation of the plant, as well as the possibility of detecting local unstable operating conditions in individual reactor sections and automatic initiation of suitable countermeasures.

As mentioned above, the invention provides for a detection of the first and/or second residual oxygen content using at least one measuring device, herein referred to but not limited to for ease of reference as at least one "first" measuring device. For example, at least one measuring device for measuring the first residual oxygen content and at least one measuring device for measuring the second residual oxygen content may also be provided. Both measuring devices are "first" measuring devices in the terminology used herein. Thus, this embodiment is also intended to be covered by the specification of the "at least one first" measuring device.

The at least one first measuring device is advantageously set up for online detection of the first and/or second residual oxygen concentration in the moist and/or dry product mixture, preferably essentially in real time. The indication "essentially in real time" is intended to represent a detection with a small delay, which is defined primarily by the time caused by a dead volume between the sampling point and an analysis unit. This is in particular not more than 60 seconds, not more than 45 seconds, not more than 30 seconds, not more than 15 seconds is particularly preferable. The response time of the corresponding analyser is to be added thereto, which is preferably not more than 10 seconds, and particularly preferably not more than 5 seconds.

The oxygen concentration can be detected, for example, via gas chromatography using a micro gas chromatograph, but preferably via a measuring cell that is sensitive to the paramagnetism of the oxygen molecule or by means of a quantum cascade laser measuring cell. Detection by means of a sensing cell sensitive to the paramagnetism of the oxygen molecule or by means of a quantum cascade laser sensing cell is preferred, since these methods allow the oxygen concentration to be measured with very low response times. In other words, the at least one first measuring device is thus set up for gas chromatographic and/or paramagnetic oxygen measurement and/or for oxygen measurement using a quantum cascade laser.

For the selective oxidation, a reactor with a catalyst bed is used according to the invention, as also mentioned above and to this extent usual. The term catalyst bed is understood here to mean a bed or solid structure comprising a catalyst material and possibly an inert material as a support. Where reference is made to several catalyst beds, these may be arranged one behind the other in the flow direction without or with intermediate zones, in particular inert zones without catalyst material. In general, the direction of flow of a gas with the reactants to be reacted corresponds in the present case to the axial direction of the reaction tubes used in a corresponding reactor.

Preferably, the reactor used according to the invention is a tube bundle reactor with fixed catalyst beds in each individual reaction tube. In order to achieve overall economic efficiency and increased operational reliability, the individual reaction tubes are advantageously equipped with several catalyst beds, in particular with 1, 2, 3, 4, 5 catalyst beds of different activity and/or composition. The cooling or heating is carried out with a suitable cooling medium, in particular a thermal oil or preferably a molten salt.

At the end of the catalyst bed, or of several catalyst beds in the case of several reaction tubes, the second measuring device is provided, which is set up to detect the variable characterizing the operating stability. If there are several reaction zones which are designed as (partial) beds of a catalyst bed, the at least one second measuring device is located at the end of the "last" zone or the "last" (partial) bed in the direction of flow. The detection of a variable characterizing an operating stability can be carried out in particular for the detection of a stable or unstable operation resulting from the process disturbances mentioned at the beginning. As mentioned above, the second measuring device is set up to detect a temperature at the end of the catalyst bed as the variable characterizing the operating stability.

Advantageously, within the scope of the invention, an oxygen content of the feed mixture is also specified using a control system. The oxygen content can be measured using at least a third measuring device. In particular, the previously mentioned measuring principles can be used here. However, the oxygen content of the feed mixture can alternatively or additionally also be determined by calculation from the measured flow rates of the feed streams supplied.

As mentioned above, the invention, using a process control and/or evaluation unit, provides for measurement data of the at least one first measuring device and/or the at least one second measuring device to be detected over an acquisition period and to evaluate and/or process the data while obtaining follow-up data.

Corresponding follow-up data may in particular comprise a value of the first and/or the second residual oxygen content determined over the detection period and/or a range of variation thereof and/or a value of the parameter characterizing operational stability determined over the detection period and/or a range of variation thereof. In other words, the measurement data of the corresponding oxygen detection can be processed in such a way that continuously (i) the time-averaged oxygen concentration in the dry and/or moist product mixture as well as (ii) the absolute time fluctuation range of the oxygen concentration in the dry and/or moist product mixture are determined and issued. The measurement data of the advantageously used temperature detection at the end of the catalyst bed can be processed in such a way that the time-averaged temperature as well as (ii) the absolute time fluctuation range of the temperature are determined and issued.

In general, time intervals of different lengths can be used for the temporal statistical evaluation and can also be evaluated simultaneously, for example, (not excluding) a moving average over short and somewhat longer time scales. The distance between minimum value and maximum value within a considered time interval is used here as a proxy for the quantification of the fluctuations. Alternatively, any other form of deviation determination can be used, such as standard deviation, standard deviation from the mean or similar common quantities within statistics.

On the basis of the subsequent data, in particular at least one of the mentioned values, the process control mentioned above can then be carried out. This comprises in particular the adjustment of at least one operating parameter, as explained below in two embodiments which can also be combined with each other.

The reactor used for the selective oxidation is cooled using at least one coolant, as mentioned above, and the at least one operating parameter may constitute or comprise a coolant temperature of the at least one coolant or cooling medium in embodiments of the invention.

The coolant can be guided in co-current or counter-current to the process gas flowing through the reactor. In particular, an additional advantage can be achieved if the coolant, especially a molten salt, is guided in counter-current to the process gas flowing through the reactor, since in this case the reaction heat from the reaction zones located downstream (i.e. in the direction of the reactor outlet) of a reaction zone can be partially utilized in the reaction zones located upstream. Likewise, within the scope of the invention, different cooling circuits can be used in combination with different catalyst layers (as also disclosed in WO 2019/243480 A1).

In particular, the coolant temperature can be reduced automatically by a program-technical routine, in particular stepwise, provided that the average oxygen concentration in the dry and/or moist product mixture is less than 0.62 mole percent or less than 0.41 mole percent. As an additional or alternative condition, it may also be provided that the variation range of the oxygen concentration in the dry and/or moist product mixture is greater than 0.2 percentage points or greater than 0.13 percentage points and/or the variation range of the temperature at the end of the catalyst bed is greater than 0.4 K. In particular, the reduction of the coolant temperature may be carried out until the average oxygen concentration in the dry and/or moist product mixture is at least 0.62 mole percent or at least 0.41 mole percent. As an additional or alternative condition, it may also be provided that the maximum variation range of the oxygen concentration in the dry and/or moist product mixture is less than 0.2 percentage points or less than 0.13 percentage points and/or the variation range of the temperature at the end of the catalyst bed is less than 0.4 K. Such an embodiment is particularly preferred if the conversion to reach steady state is to remain almost constant and a longer time to reach steady state operation is acceptable.

However, the at least one operating parameter may also, alternatively or additionally, represent or comprise an oxygen content of the feed mixture.

The oxygen concentration or the molar ratio between oxygen and the reactant hydrocarbon, in particular ethane, can then be increased in the reaction feed stream or feed mixture, in particular automatically by a program routine and in particular stepwise, provided that the average oxygen concentration in the dry and/or moist product mixture is less than 0.62 mole percent or less than 0.41 mole percent. As an additional or alternative condition, it may also be provided that the variation range of the oxygen concentration in the dry and/or moist product mixture is greater than 0.2 percentage points or greater than 0.13 percentage points and/or the variation range of the temperature at the end of the catalyst bed is greater than 0.4 K. Increasing the oxygen concentration or the molar ratio between oxygen and the reactant hydrocarbon, in particular ethane, in the reaction feed stream or feed mixture may be carried out in particular until the average oxygen concentration in the dry and/or moist product mixture is at least 0.62 mole percent or at least 0.41 mole percent. As an additional or alternative condition, it may also be provided that the maximum variation range of the oxygen concentration in the dry and/or moist product mixture is less than 0.2 percentage points or less than 0.13 percentage points and/or the variation range of the temperature at the end of the catalyst bed is less than 0.4 K. This embodiment is particularly preferred if a rapid setting of a stable operating condition is required and if, in particular, the hydrocarbon conversion (ethane conversion) is to be increased at the same time.

The exact mode of action of the routines described, in particular those implemented by programming, can also be varied by taking into account different time evaluation intervals, for example, in order to be able to adapt them to specific reactor designs.

In contrast to a pilot reactor with one reaction tube, as used in the examples explained in connection with the figures, commercial reactors have a large number of reaction tubes (several 1,000 to several 10,000). The reaction flow in the various reaction tubes will inevitably be subject to a range of variation, for example, due to varying flow conditions on the coolant side or also varying mixing conditions on the process gas side.

Instrument-based monitoring of each individual reaction tube is practically impossible. In particular, the process gas composition at the reactor outlet can only be measured for the resulting total mixture. As described above, an increased range of fluctuation of this measurand, for example, of oxygen at the reactor outlet, can only indicate a globally unstable reactor operation, since monitoring of the process gas inevitably results in an averaging over all reaction tubes, and thus can only be incorporated into the process control at an advanced stage of escalation.

In contrast, the analysis of temperature measurements in reaction tubes is particularly suitable for the early detection of unstable reaction conditions in individual reactor sections. In industrial practice, it is common to equip a limited number of reaction tubes with temperature sensors along the catalyst bed. With these corresponding individual measuring points, representative samples of the temperature conditions in different areas of the reactor can be taken to some extent.

An essential feature of a particularly preferred embodiment of the invention is that the verification of the time-averaged temperature and its range of variation over time is carried out for several reaction tubes, preferably for all reaction tubes equipped with devices for temperature measurement in the catalyst bed (in particular at the end of the catalyst bed).

The programmatic adjustment of the reaction control, i.e. the adjustment of the operating parameters, can be made, for example, if data from at least one, two, five, or ten or at least 1, 2, 5, or 10 percent of the temperature measuring points or second measuring devices indicate unstable reaction operation in at least individual areas of the reactor (based on the above criteria).

Thus, formulated more generally, the reactor used for selective oxidation may comprise a plurality of reaction tubes, wherein the at least one first measuring device and/or the at least one second measuring device is associated with one or a portion of the reaction tubes.

As mentioned several times, the invention can be used in particular in a process for the oxidative dehydrogenation of ethane, in which case the product hydrocarbon is ethylene and the feed hydrocarbon ethane, and in which case the selective oxidation is carried out as an oxidative dehydrogenation using a catalyst containing at least the elements molybdenum, vanadium, niobium and optionally tellurium, in particular a mixed oxide of said elements.

The oxidative dehydrogenation can be carried out in particular at a temperature of the catalyst in a range between 240 and 500° C., preferably between 280 and 450° C., further preferably between 300 and 400° C. In particular, one or more reactors can be used for the oxidative dehydrogenation, wherein a total pressure of the reaction feed stream or feed mixture at the inlet of the reactor or reactors can be provided in a range between 1 and 10 bar (abs.), preferably between 2 and 6 bar (abs.). In particular, the feed mixture can be provided with a water content that can be set between 5 and 95 percent by volume, in particular between 10 and 50 percent by volume, further in particular between 14 and 35 percent by volume. In a particularly preferred embodiment, an ODHE is used in which the molar ratio of water to ethane in the reaction feed stream is at least 0.23.

A plant for producing a product hydrocarbon, which is adapted to subject a feed hydrocarbon in a feed mixture containing the feed hydrocarbon and oxygen to selective oxidation to obtain a product mixture containing the product hydrocarbon and water, wherein the feed hydrocarbon is ethane and the product hydrocarbon is ethylene, and the selective oxidation is carried out in the form of oxidative dehydrogenation of ethane, and which is arranged to form, with separating at least part of the water, a subsequent mixture from at least part of the product mixture, the plant being arranged to carry out the method in such a way that the oxygen contained in the feed mixture is partially converted during the selective oxidation, so that the product mixture has a first residual oxygen content and the subsequent mixture has a second residual oxygen content, is also an object of the invention. Here, the first residual oxygen content is at least 0.41 mole percent and the second residual oxygen content is at least 0.62 mole percent.

For embodiments of a corresponding plant, which can be set up in particular for carrying out a method or an embodiment as explained above, reference is expressly made to the above explanations.

The invention is further explained below with reference to specific examples according to the invention with associated figures.

The previously mentioned unstable operation in the event where a concentration of oxygen was too low in the (dry) product mixture was investigated in tests using a pilot reactor. The pilot reactor used is a fixed-bed reactor cooled by molten salt. This is the same pilot reactor used to obtain the results described in WO 2019/243480A1. The pilot reactor is designed as a tube-in-tube reactor, with the inner tube filled with the catalyst fixed bed (reaction chamber). Between the wall of the reaction chamber and the outer tube is the coolant chamber, i.e. this chamber is flown through with the coolant, in this case a liquid molten salt, in counter-current to the direction of flow of the reaction feed stream. The molten salt is a mixture of sodium nitrite, sodium nitrate and potassium nitrate. The dimensions (i.e. length, inner diameter and wall thickness) of the pilot reactor reaction chamber are consistent with the typical dimensions of a single tube from a typical commercial (large scale) shell-and-tube reactor. Thus, the pilot reactor can be regarded as a true replica of a large-scale industrial plant, since the same conditions (flow field, temperature or temperature gradients, pressure gradients, etc) as in a single tube of a technical shell-and-tube reactor can be established in this pilot reactor due to its geometry, and thus the reaction can be tested under real technical conditions.

For the test operation, the pilot reactor was filled with a three-stage catalyst bed in terms of catalytic activity. The catalytically active base material was exactly the same for each stage. The bed was arranged in such a way that the catalytic activity increased in the flow direction of the reaction feed stream. The different activity gradation was achieved (as also described in WO 2019/243480 A1) by using catalyst shaped bodies (rings) with different amounts of binder, which is needed to form the shaped bodies, added to the exactly same catalytically active base material. Thus, the binder also acts as a diluent of the active catalyst material. Each catalyst layer had the same height and thus the same volume. The mass of catalyst active material filled, i.e. the mass of the pure active component of the catalyst without the respective binder components, was 2.13 kg. Upstream and downstream of the three-stage catalyst bed there was a bed of inert material of the same shape and similar size as the catalyst moldings.

The pilot reactor was then operated for a period of about 1700 h (about 71 days) with a reaction feed stream consisting essentially of ethane, oxygen, and water (vapor). The molar ratio of ethane to oxygen to water(vapor) in the reaction feed stream was 59 to 24 to 17. The pressure at the reactor inlet was 3.81 bara, and the GHSV was 1088 $h^{-1}$ (or standard cubic meters of gas per hour and per cubic meter of catalyst). A consistent, stable and very good reactor or catalyst performance in terms of ethane conversion and selectivities to the desired commercial value products ethylene and acetic acid was observed throughout the test period. The ethane conversion was about 52.5%, the selectivity to ethylene about 82.5% and the selectivity to acetic acid about 12%, i.e. a total selectivity to commercial value products of more than 94% could be achieved.

Figure 2:
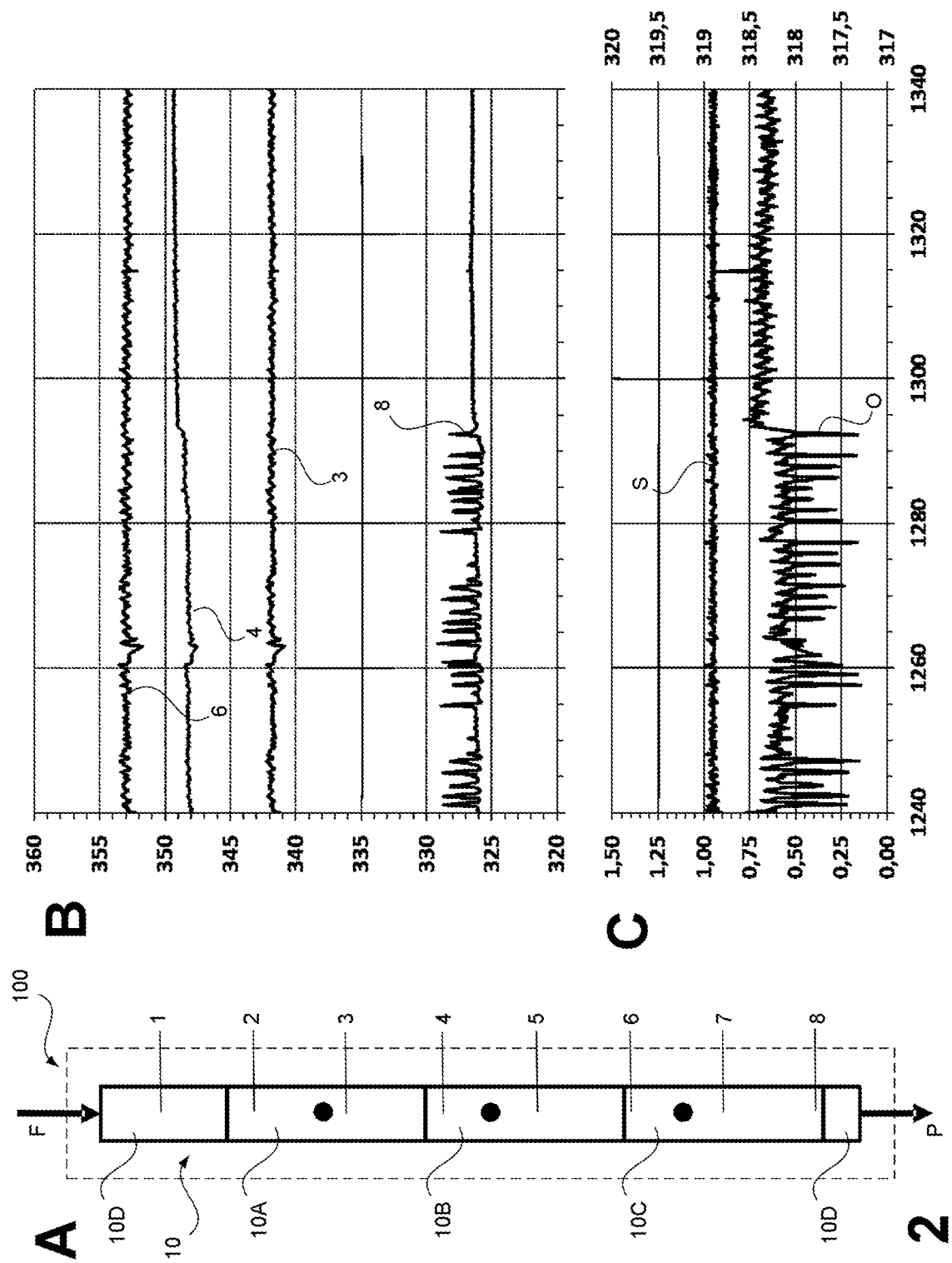

The sensitivity of the stability of the reaction operation as a function of the average oxygen concentration in the dry product gas is shown in FIGS. 1 and 2 and the associated Tables 1 and 2.

Example 1

During operation of an ODHE reactor, as mentioned above, an increased coolant temperature can occur as a process disturbance. An only slightly increased coolant temperature in the range of a few tenths of a Kelvin has no significant influence on the ethane conversion, but a significant influence on the oxygen concentration in the dry product gas.

However, it can also be observed that after an initial run-in period of the catalyst and operation of the reactor at a turnover point targeted for the process, the catalytic activity continues to increase continuously (very slowly) over a period of time, but this occurs to such an extent that this increase has no significant effect on the ethane turnover, but does have a marked effect on the oxygen concentration in the dry product gas. A gradual increase in catalyst activity is not a process disturbance in the strict sense, but the effects on the stability of the operation are the same.

This is described with reference to FIG. 1 and Table 1. In the left part A of FIG. 1, there is a reaction tube 10 with three catalyst fillings or catalyst beds 10A, 10B, 10C, whose activity increases in the direction of the reactor outlet, which is shown at the bottom in FIG. 1. Regions not equipped with catalyst are indicated by 10D. A reactor 100, of which the reaction tube 10 is a part, is indicated in a highly simplified manner. A feed mixture F is supplied to the reaction tube 10 and a (still moist) product mixture P is withdrawn, from which most of the water contained and the acetic acid formed are condensed out further downstream, before the first measuring device (online oxygen measurement by means of a paramagnetic measuring cell). In each of the catalyst beds, approximate positions of temperature hotspots are shown with filled in circles. Temperature measuring points are illustrated with 1 to 8. Measuring point 8 is located approximately 5 cm before the end of catalyst bed 10C in the direction of the reactor outlet.

Diagrams B and C show, in each case opposite a running time ("time on stream") on the horizontal axis, on the one hand a catalyst temperature at measuring points 3, 4, 6 and 8 on the vertical axis in ° C. (diagram B) and on the other hand a temperature of a molten salt S on the right vertical axis in ° C. as well as a residual oxygen content of the dry product mixture on the left vertical axis in volume or mole percent (diagram C) (as mentioned above, the oxygen measuring point in this pilot plant is located downstream of the separation of process condensate, i.e. in the dry process gas). Table 1 again specifies these and corresponding other values at appropriate time intervals.

TABLE 1

| Size | Unit | 125 to 145 hours | 145 to 167 hours | 167 to 215 hours |
|---|---|---|---|---|
| Salt temperature | ° C. | 314.3 | 314.2 | 314.0 |
| Temperature fluctuations at measuring point 8 | K | increasing from 0.6 to 2.7 | 3.0 | 1.4 to less than 0.4 |
| Mean oxygen concentration in the dry product mixture, measured | mol % | 0.57 | 0.61 | 0.70 |
| Mean oxygen concentration in the moist product mixture, calculated | mol % | 0.38 | 0.40 | 0.46 |
| Maximum variation of the oxygen concentration in the dry product mixture measured | mol % | 0.27 | 0.4 | 0.15 to 0.06 |
| Maximum variation of oxygen concentration in the moist product mixture, calculated | mol % | 0.18 | 0.26 | 0.10 to 0.04 |
| Ethane turnover | % | 52.5 | 52.4 | 52.3 |

The calculation of the maximum variation of the oxygen concentration in the moist product mixture was carried out in such a way that the same relation of the maximum variation to the mean value was assumed for the maximum variations in the moist product mixture as for the dry product mixture.

As shown in FIG. 1 and Table 1, periodic fluctuations in the temperature at the end of the catalyst bed (measuring point 8) and in the oxygen concentration in the dry product mixture are observed at an average coolant temperature or molten salt temperature of 314.3° C. (period 125 to 145 hours in FIG. 1). The oxygen concentration showed a minimum when the temperature at measuring point 8 showed a maximum and vice versa. These fluctuations were not constant at the coolant temperature of 314.3° C., but increased in intensity (maximum temperature fluctuations increased from about 0.6 to 2.7 K, maximum oxygen concentration fluctuations increased to 0.27 mol %). This means that the system is unstable and is slowly swung in. Subsequently, the coolant temperature was lowered by 0.1 K (period 145 to 167 hours in FIG. 1), which obviously led to stabilization of the temperature as well as oxygen fluctuations and a slight increase in the oxygen concentration of the dry product mixture. However, the maximum fluctuations in temperature at the end of the catalyst bed of 3.0 K or maximum fluctuations in oxygen concentration of 0.4 mol % were larger compared to the observed fluctuations in the period 125 to 145 hours. A further reduction of the coolant temperature by 0.2 K to 314.0° C. initially led at first to a significant reduction of the temperature fluctuations at the end of the catalyst bed to 1.4 K. After running for approximately 20 h at these conditions, the temperature fluctuations were less than 0.4 K. It should be mentioned here that all other temperature measuring points showed constant very small fluctuations during the entire time and were not affected by the measures described here. Thus, the effect actually occurs only at the end of the catalyst bed. During the same period (167 to 215 hours), due to the slightly lower coolant temperature, the average oxygen concentration in the dry product gas increased to 0.70% with maximum fluctuations of initially maximum 0.15 mol % and after about 20 h running time at the operating point of only 0.06 mol %. The ethane conversion was practically unaffected by the slight reduction in coolant temperature during this process and remained at almost the same level of 52.3 to 52.5% throughout. A slight reduction in coolant temperature thus leads to a significant stabilization of the reaction behavior while maintaining the targeted ethane conversion.

Example 2

For the description of FIG. 2, please refer to the description of FIG. 1 for the parameters shown.

TABLE 2

| Size | Unit | 1240 to 1290 hours | 1290 to 1340 hours |
|---|---|---|---|
| Salt temperature | ° C. | 318.9 | 318.9 |
| Ratio of oxygen to ethane in the feed mixture and relative change versus time interval 1240 to 1290 hours (in parentheses). | mol/mol (%) | 0.408 | 0.417 (+2.2) |
| Temperature fluctuations at measuring point 8 | K | Max. 2.8 | <0.2 |
| Average oxygen concentration in the dry product mixture, measured | mol % | 0.54 | 0.65 |
| Mean oxygen concentration in the moist product mixture, calculated | mol % | 0.35 | 0.43 |
| Maximum variation of oxygen concentration in dry product mixture, measured | mol % | 0.62 | 0.15 |
| Maximum variation of oxygen concentration in the moist product mixture, calculated | mol % | 0.41 | 0.10 |

At the same coolant temperature, the small 2.2% increase in the molar ratio of oxygen to ethane in the feed mixture, from 0.408 to 0.417, resulted in a decrease in the temperature fluctuations from 2.8 K at the end of the catalyst bed to less than 0.2 K. Again, the very small fluctuations in the other temperatures in the catalyst bed remain unaffected by the increase in oxygen concentration in the feed mixture. The increase in the oxygen concentration in the feed mixture led to an increase in the average oxygen concentration in the dry product mixture from 0.54 mol % to 0.65 mol %. At the same time, the maximum (absolute) variations of oxygen concentration in the dry product gas stream decreased from 0.62 to 0.15 mol %. Unlike Example 1, the increase in oxygen concentration in the feed mixture resulted in a 0.9 percentage point increase in ethane conversion from 51.8% to 52.7%. This adjustment or de-escalation method can therefore also increase the ethane conversion to a certain extent.

The invention claimed is:

1. A method for producing a product hydrocarbon, comprising:
    subjecting a feed hydrocarbon in a feed mixture containing the feed hydrocarbon and oxygen to selective oxidation in a reactor having a catalyst bed to obtain a product mixture containing the product hydrocarbon and water, wherein the feed hydrocarbon is ethane and the product hydrocarbon is ethylene and the selective oxidation is carried out in the form of oxidative dehydrogenation of ethane; and
    forming a subsequent mixture from at least part of the product mixture by separating at least part of the water;
    wherein:
        the method is carried out in such a way that the oxygen contained in the feed mixture is partially converted during the selective oxidation, so that the product mixture has a first residual oxygen content and the subsequent mixture has a second residual oxygen content;
        a detection of the first and/or of the second residual oxygen content is carried out using at least one first measuring device;
        at least one second measuring device is provided at an outlet end of the catalyst bed, which second measuring device is set up to detect a variable characterizing an operating stability, the variable characterizing the operating stability being a temperature at the outlet end of the catalyst bed;
        using a process control and/or evaluation unit, measurement data of the at least one first measuring device and/or the at least one second measuring device are detected over a detection period and are evaluated and/or processed to obtain follow-up data;

process control is carried out on the basis of the follow-up data, wherein the process control comprises adjusting at least one operating parameter;

the reactor used for the selective oxidation is cooled using at least one coolant; and the at least one operating parameter represents or comprises a coolant temperature of the at least one coolant or an oxygen content of the feed mixture.

2. The method of claim 1, wherein the first residual oxygen content is at least 0.41 mole percent and the second residual oxygen content is at least 0.62 mole percent.

3. The method of claim 2, wherein the first residual oxygen content is at least 0.41 mole percent and the second residual oxygen content is at least 0.62 mole percent, and wherein the second residual oxygen content is at most 2 mole percent.

4. The method of claim 3, wherein the at least one first measuring device is set up for gas chromatographic and/or paramagnetic oxygen measurement and/or is set up for oxygen measurement using a quantum cascade laser.

5. The method of claim 2, wherein the first residual oxygen content is at least 0.41 mole percent and the second residual oxygen content is at least 0.62 mole percent, or wherein the second residual oxygen content is at most 2 mole percent.

6. The method according to claim 5, wherein the at least one first measuring device is set up for gas chromatographic and/or paramagnetic oxygen measurement and/or is set up for oxygen measurement using a quantum cascade laser.

7. The method of claim 1, in which an oxygen content of the feed mixture is predetermined using a control system, the oxygen content of the feed mixture being detected using at least a third measuring device and/or being derived from process parameters.

8. The method of claim 1, wherein the follow-up data comprises a value of the first and/or the second residual oxygen content determined over the detection period and/or a range of variation thereof and/or a value of the operating stability characterizing variable determined over the detection period and/or a range of variation thereof.

9. The method according to claim 1, wherein the at least one operating parameter represents or comprises a coolant temperature of the at least one coolant and an oxygen content of the feed mixture.

10. The method according to claim 1, wherein the coolant is passed through the reactor in co-current or counter-current flow to the feed mixture.

11. The method according to claim 1, wherein the reactor used for the selective oxidation comprises a plurality of reaction tubes, wherein the at least one first measuring device and/or the at least one second measuring device is associated with one or a part of the reaction tubes.

12. The method according to claim 1, wherein the oxidative dehydrogenation of ethane is carried out using a catalyst containing at least the elements molybdenum, vanadium, and niobium.

13. The method according to claim 12, wherein the catalyst further contains tellurium.

14. The method of claim 1, wherein the first residual oxygen content is at least 0.41 mole percent and the second residual oxygen content is at least 0.62 mole percent, or wherein the second residual oxygen content is at most 2 mole percent.

15. The method according to claim 14, wherein the at least one first measuring device is set up for gas chromatographic and/or paramagnetic oxygen measurement and/or is set up for oxygen measurement using a quantum cascade laser.

16. A plant for producing a product hydrocarbon in the process according to claim 1, the plant comprising:

a feed source comprising a feed hydrocarbon;

a reactor configured to receive the feed hydrocarbon from the feed source and subject a feed mixture containing the feed hydrocarbon and oxygen to selective oxidation to obtain a product mixture containing the product hydrocarbon and water, wherein the feed hydrocarbon is ethane and the product hydrocarbon is ethylene and the selective oxidation is carried out in the form of oxidative dehydrogenation of ethane;

a separator configured to form, by separating at least part of the water, a subsequent mixture from at least part of the product mixture;

wherein the plant is arranged to carry out the process in such a way that the oxygen contained in the feed mixture is partially reacted during the selective oxidation, so that the product mixture has a first residual oxygen content and the subsequent mixture has a second residual oxygen content;

at least one first measuring device configured to detect the first and/or the second residual oxygen content;

at least one second measuring device provided at the outlet end of the catalyst bed, wherein the at least one second measuring device is configured to detect a variable characterizing an operating stability, the variable characterizing the operating stability being a temperature at an outlet end of the catalyst bed; and a process control and/or evaluation unit configured to detect measurement data of the at least one first measuring device and/or the at least one second measuring device over a detection period and to evaluate and/or process the measurement data while obtaining follow-up data;

wherein the plant is configured to carry out a process control on the basis of the follow-up data, wherein the process control comprises adjusting an operating parameter;

wherein the reactor is configured to be cooled using at least one coolant; and wherein the at least one operating parameter represents or comprises a coolant temperature of the at least one coolant and/or an oxygen content of the feed mixture.

* * * * *